United States Patent [19]

Delarue et al.

[11] Patent Number: 4,619,284

[45] Date of Patent: Oct. 28, 1986

[54] PYROTECHNIC VALVE

[75] Inventors: Jean-Jacques Delarue, Vélizy; Claude Ego, Verneuil sur Seine, both of France

[73] Assignee: Societe Nationale Industrielle Aerospatiale, Verneuil sur Seine, France

[21] Appl. No.: 712,645

[22] Filed: Mar. 18, 1985

[30] Foreign Application Priority Data

Mar. 21, 1984 [FR] France ................. 84 04391

[51] Int. Cl.⁴ ........................................... F16K 17/14
[52] U.S. Cl. ..................... 137/67; 137/68.1; 137/68.2; 251/61; 251/76; 251/77
[58] Field of Search ............... 137/67, 68 A; 251/61, 251/76, 77

[56] References Cited

U.S. PATENT DOCUMENTS

| 2,602,467 | 7/1952 | Griswold | 251/77 X |
| 3,111,133 | 11/1963 | Fulton | 137/68 A |
| 3,202,162 | 8/1965 | Eckardt | 137/68 A |
| 3,478,760 | 11/1969 | Hosek | 137/68 A |
| 3,494,370 | 2/1970 | Wahl | 137/68 A |
| 3,871,615 | 3/1975 | Donner | 251/77 X |
| 4,111,221 | 9/1978 | Olsen | 251/61 |

Primary Examiner—Harold W. Weakley

[57] ABSTRACT

The pyrotechnic valve according to the invention comprises one or more pyrotechnic devices able to produce gases under a high pressure, which has the effect of suddenly deforming a membrane equipped with a rigid weight. The latter projects a punch, which shears a tight end fitting, thus freeing the fluid passage. The membrane ensures a perfect seal between the fluid circulation zone and the zone containing the gases produced by the pyrotechnic devices.

7 Claims, 5 Drawing Figures

PYROTECHNIC VALVE

BACKGROUND OF THE INVENTION

The present invention relates to a pyrotechnic valve making it possible either to open an initially closed pipe, or to close an initially open pipe.

At present, pyrotechnic valves are widely used for opening a pipe through which passes a fluid, particularly on aircraft or spacecraft. The operating principle consists of using gases under a high pressure produced by a pyrotechnic device, in order to displace a rigid member. The latter can be a sliding valve core having one or more proturberances, in order that its displacement has the effect of raising a valve, so that the passage of the fluid is possible. In other types of valve, the mobile rigid member perforates a pipe or cuts off a precut end fitting. This second type of valve is used more particularly in spacecraft, e.g. for the thrust of a propulsive fluid mass, a gas being stored under high pressure (a few hundred bars), the opening of the valve enabling it to expand and enter the pressurized liquid tank which is at about 10 bars, whic is sufficient to force the liquid into the circuit of the power plant. Another spatial application is the analysis of the atmosphere surrounding a planet. The measuring chamber, which is linked with the downstream part of the valve, is placed under a vacuum prior to launch. The upstream part fills with gas, when the craft arrives in the atmosphere to be studied and the opening of the valve brings about the filling of the measuring chamber by suction.

It is clear that the valve must have a perfect tightness, particularly in the second case, in order not to falsify the measurements, or when the fluid circulating in the valve represents a danger to the environment. However, most of the existing systems suffer from the disadvantage of not having an adequate seal or tightness between the zone in which are located the gases produced by the pyrotechnic devices and the fluid passage zone. As a result, such valves do not comply with certain severe requirements, and cannot be used in pneumatic systems carried by spacecraft, where it is required that the environment is not polluted by their operation.

SUMMARY OF THE INVENTION

The object of the present invention is to eliminate this disadvantage by proposing a pyrotechnic valve having an excellent sealing action between the fluid passage zone and the zone in which is located the gases produced by the pyrotechnic device and which also has a reduced overall dimensions at a low mass, so that it can be integrated into complex systems of launchers and satellites and is able to withsand the severe environmental conditions in space.

The pyrotechnic valve according to the invention in conventional manner comprises a valve body having an inner cavity, whose walls have a fluid inlet and a fluid outlet, a rigid weight mounted on a substantially disk-shaped, deformable membrane, which tightly separates the said inner cavity into two parts, one being linked with the gases produced by a pyrotechnic device and the other containing the fluid inlet and outlet, the weight being able to move under the action of the gases produced by the pyrotechnic device, so that it displaces a member located in the second part of said cavity. According to the invention, the membrane can plastically deform under the action of the gases produced by the pyrotechnic device and said inner cavity has a seat, to which is applied the membrane once it has been deformed.

According to another feature of the valve according to the invention, the assembly constituted by the membrane and the weight has, on the gas intake side, a recess used for absorbing the first thermal shock of the gases.

According to a first embodiment, when the valve according to the invention is used for opening an initially closed pipe, the moving part is a punch, which is able to shear an end fitting closing the fluid inlet.

Acccording to a first variant, the weight and the punch are separated from one another. In a second variant, the punch and the weight are in one part having a passage hole arranged so as to permit the passage of fluid, once the part constituted by the weight and the punch has moved under the action of the gases. In both cases, it is advantageous to provide means making it possible to lock the punch within the cavity, once it has been displaced under the action of the weight.

The valve according to the invention can also be used for closing an initially open pipe. In this case, the fluid inlet and outlet are open and the valve has a plug or cap arranged within the inner cavity and which can move under the action of the weight so as to close at least one of the fluid inlet and outlet ports.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE PREFERRED EMBODIMENTS

Figure 1:
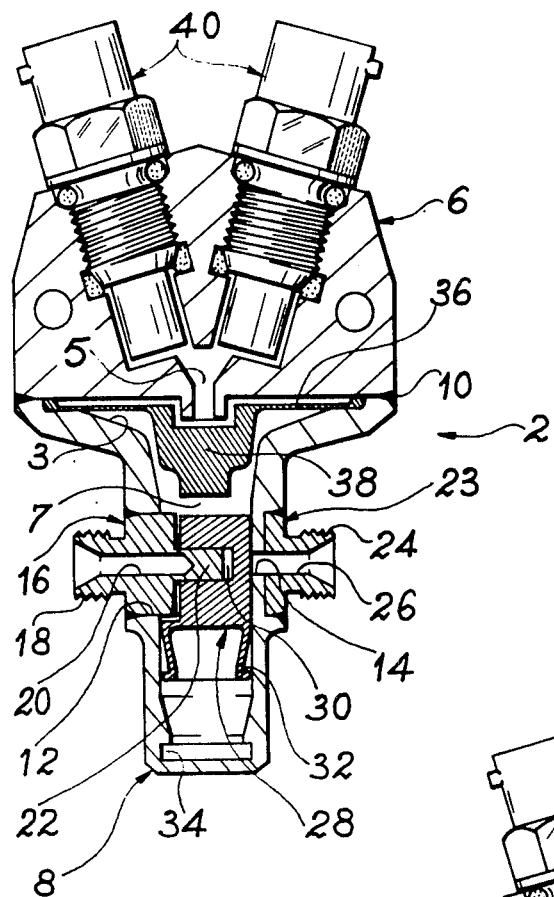
FIG. 1 a diagrammatic sectional view of a first embodiment of the pyrotechnic valve according to the invention prior to the triggering of the pyrotechnic device or devices.

The sectional view of FIG. 1 illustrates a first embodiment of the valve according to the invention usable for opening an initially closed pipe, where it is possible to see that the device comprises a valve body 2, constituted by a first part or upper body 6 and a second part or lower body 8, which are joined to one another, e.g. by means of a weld 10. The lower body 8 is substantially cylindrical and is hollow, whilst upper body 6 is also substantially cylindrical and has a recess, so that once the upper and lower bodies have been assembled, a cavity 3 is defined within valve body 2. The walls of the lower body 8 are provided with a first opening 12 for the supply of a fluid and a second opening 14 for the discharge of said fluid, the two openings 12, 14 being located substantially in accordance with a same diameter of the lower body 8. An end fitting 16 is placed in the inlet 12 and can be fixed in said inlet by any means, particularly by welding. The end fitting 16 can be connected to a fluid supply pipe by means of a thread 18 and has a blind hole 20. That part of end fitting 16 located within body 8 has a protruberance 22, in which is located the bottom of the blind hole 20. The fluid outlet 14 has an end fitting 23, which can also be fixed by welding or any other means to body 8, the end fitting 23 having a thread 24 enabling it to be connected to a fluid discharge pipe. Openings 12 and 14 can have a random shape, as can the end fittings 16 and 23. Protuberance 22 can also have a random shape (e.g. rectangular or circular cross-section). End fitting 23 also has a passage orifice 26, but is not a blind hole, said orifice 26 passing directly through the end fitting 23.

Within body 8 and level with openings 12, 14 is provided a rigid part or punch 28, which has a cavity 30, whose shape and dimensions substantially correspond to that of the protuberance 22, so that the latter can be maintained in cavity 30. According to a preferred embodiment, punch 28 is equipped with locking means which, in the presently described embodiment, comprise hooks 32, which can penetrate a space 34 at one end of cavity 3.

A substantially disk-shaped membrane 36 equipped with a rigid weight 38 is tightly fixed within the cavity 3 and separates the latter into a first part 5 and a second part 7. The first part 5 is linked with the gases produced by one or more pyrotechnic devices such as 40. In principle, one of these devices is sufficient, but it is preferable to have two, in order to increase the security of operation. Devices 40 can be constituted by fuses, cartridges or any other system able to suddenly produce a large amount of gas under high pressure. In the embodiment represented here, devices 40 are mounted on the upper body 6 of valve body 2, but it would not pass outside the scope of the invention to provide a pyrotechnic device separated from the valve and connected to cavity 5 by a connecting pipe.

Figure 2:
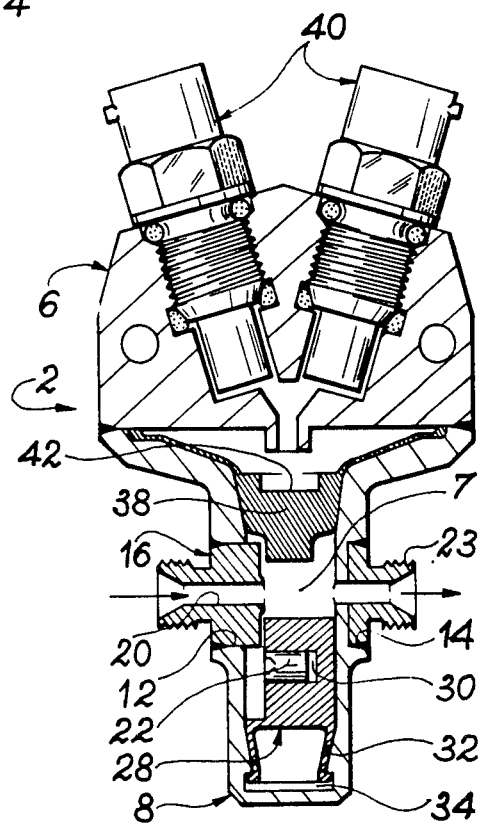
FIG. 2 a view similar to FIG. 1 showing the state of the valve once the weight and punch have been displaced under the action of the gases.

The apparatus functions as follows. On triggering the pyrotechnic devices 40, a large amount of gas is produced in cavity 5, which has the effect of suddenly increasing the pressure and of deforming the circular membrane 36. Weight 36 is then projected against punch 28. Under the action of the impact, the punch is forced downwards, shearing the protuberance 22 of end fitting 16. The shape and dimensions of the assembly have been designed in such a way that the impact moves the punch 28 up to the lower part of body 8, so as to ensure the locking of punch 28 by the hooks 32 catching in space 34 (FIG. 2). Protuberance 22 of end fitting 16 is displaced by punch 28 and is maintained within cavity 30. Hole 20 then issues into the inner space of the lower body 8 and the fluid can circulate through the valve from inlet 12 to outlet 14, in the manner indicated by the arrows in FIG. 2.

It is also possible to see from FIG. 2 that the weight 38 has a recess 42 on the side at which the gases produced by devices 40 arrive. This recess absorbs the first thermal shock of the gases and acts as a deflector for reducing the thermal effects on the peripheral part of membrane 36.

Thus, the gases produced by the pyrotechnic device 40 are at a very high temperature and can constitute a flame. If there were no recess 42, the flame would come into contact with membrane 36 and would damage or even perforate the same, so that the membrane would no longer fulfil its main sealing function with respect to the liquid circulating through the valve (this sealing function will be explained in greater detail hereinafter with reference to FIGS. 2 and 3). As a result of the presence of the recess, the flame only comes into contact with weight 38 which, in view of its thickness will not be fractured, transfers part of its heat thereto and it is only cooled gas which comes into contact with membrane 36, so that any risk of the deterioration thereof is eliminated.

Figure 3:
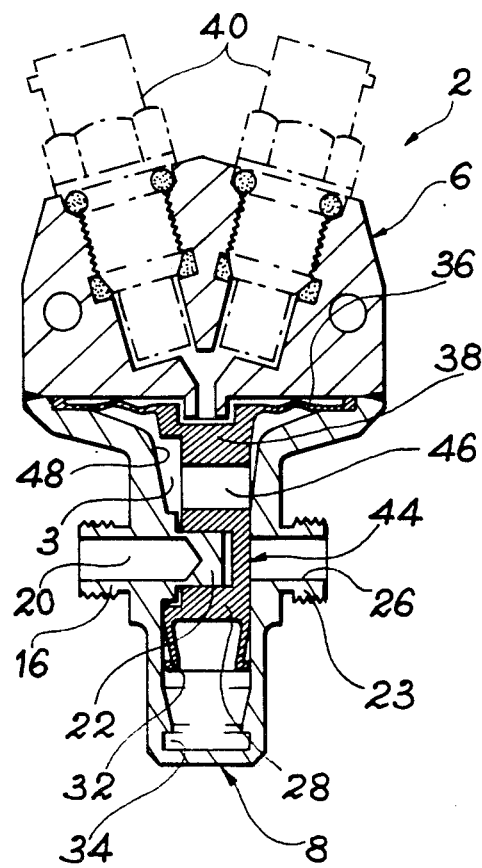
FIG. 3 a view similar to FIG. 1 illustrating a second embodiment of the valve according to the invention, before triggering the pyrotechnic device or devices.

FIG. 3 illustrates another embodiment of the valve according to the invention, in which the end fittings 16, 23 are not connected to the lower body 8 and instead form an integral part thereof. End fittings 16 also has a blind hole 20 and a protuberance 22. The pyrotechnic devices 40 are identical to those of FIG. 1, and have been shown in mixed line form for reasons of greater clarity. There is once again a disk-shaped membrane 36 subdividing cavity 3 into two parts, but, in this variant, weight 38 and punch 28 are joined so as to form a single membrane 44 having a fluid passage opening 46. The blind hole 20 of end fitting 16, hole 26 of end fitting 23 and the passage 46 are cylindrical and have identical diameters.

Figure 4:
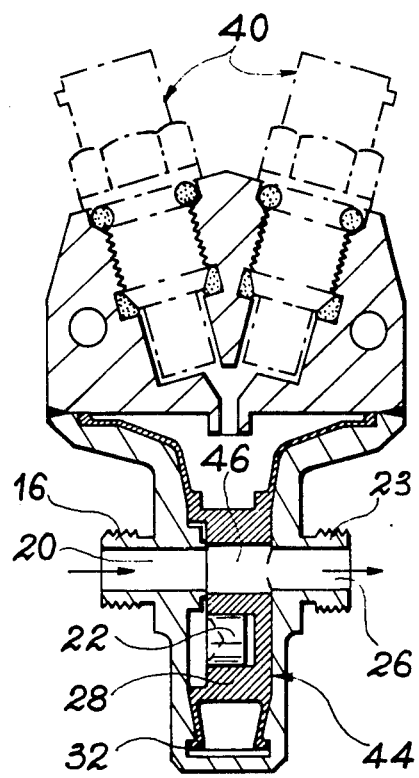
FIG. 4 a view similar to FIG. 3 showing the state of the valve once the assembly constituted by the weight and the punch has been moved under the action of the gases.

The operation of the apparatus is the same as in the case of FIGS. 1 and 2, but it is in this case the part 44 which moves as a result of the deformation of the membrane 36, caused by the gases from devices 40. Thus, the situation is as shown in FIG. 4, where punch 28 is locked by means of hooks 232, whilst the opening 46 in part 44 is aligned with holes 20, 26 of end fittings 16, 23. FIG. 3 shows that the walls of cavity 3 have, on the side of punch 28 with respect to membrane 36, a frustum-shaped portion 48 against which bears the weight and possibly also the membrane 36, once the assembly has been deformed and displaced under the action of the gases.

Due to the fact that the membrane deforms plastically and without breaking ensures a perfect seal with respect to the fluid circulating in the device. Even in part of the latter infiltrates between the inner wall of the lower body 8 on the one hand, weight 38 and/or membrane 36 on the other, there are no risks of leaks to the outside, or from the pyrotechnic gas arrival side, because the membrane is welded to the lower body 8 and the weld is not mechanically stressed during its deformation. This is particularly important when used in space, where it is vital not to pollute the environment.

Figure 5:
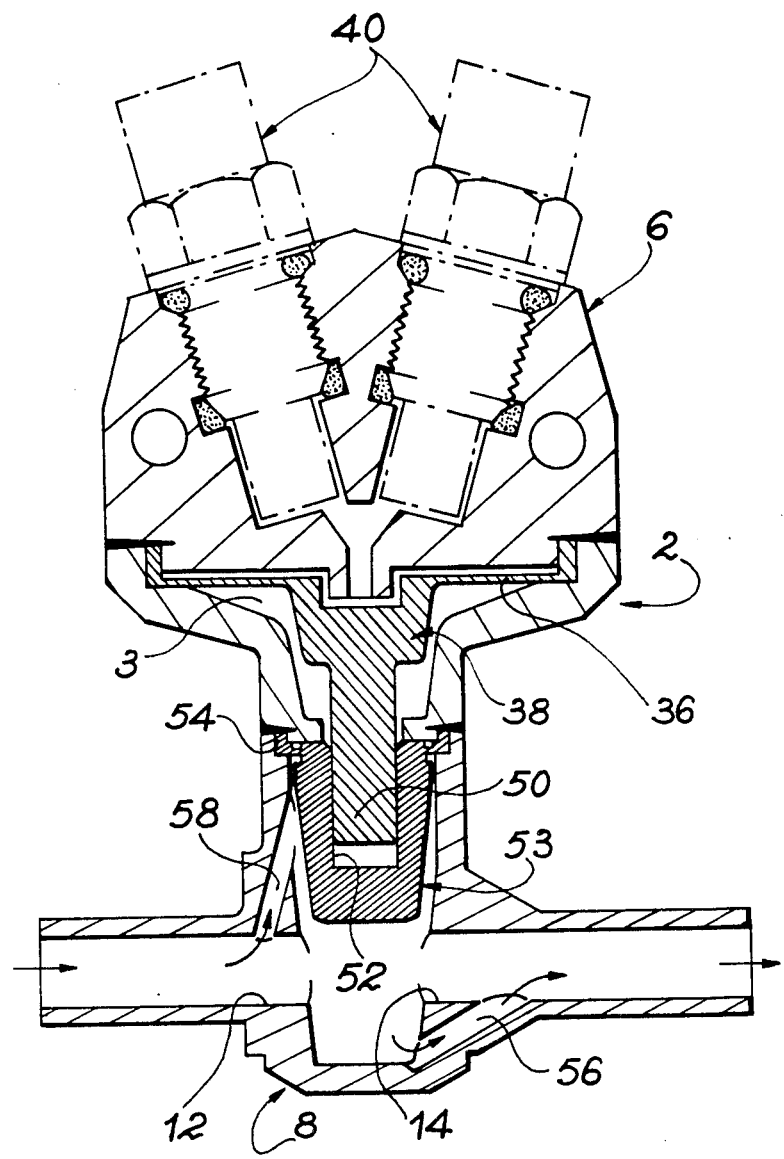
FIG. 5 a view similar to FIG. 1 illustrating on a larger scale a third embodiment of the valve according to the invention, usable for closing an initially open pipe, prior to the triggering of a pyrotechnic system or systems.

FIG. 5 is a view similar to FIGS. 1 and 3, illustrating on a larger scale a third embodiment of the valve according to the invention, which can be used for closing an initially open pipe.

The structure is substantially the same as the two preceding cases, with a valve body 2 constituted by an upper body 6 and a lower body 8 and having a cavity 3 subdivided into two parts by a membrane 36, on which is mounted a weight 38. The pyrotechnic devices 40 are the same, but weight 38 has a substantially cylindrical solid extension 50, which enters a correspondingly shaped cavity 52, provided in a plug or cap 53. The latter is substantially frustum-shaped and its dimensions correspond to those of the lower part of cavity 3, into which open out the fluid inlet 12 and outlet 14.

In the initial position, plug 53 is fixed within cavity 3 by means of a flange or collar 54 and its dimensions are such that it does not disturb the passage of the fluid from inlet 12 to outlet 14.

On triggering the pyrotechnic device or devices 40, membrane 36 deforms in the aforementioned manner, and weight 38 is forced downwards. Proturberance 50 strikes the bottom of cavity 52, which has the effect of shearing the plug level with collar 54 and of projecting it towards the bottom of cavity 3, As the shape and dimensions of the plug correspond to those of the bottom of the cavity 3, this has the effect of closing the fluid inlet 12 and outlet 14.

FIG. 5 shows that there are two supplementary pipes, one of which 56 connects the lower part of cavity 3 to the fluid outlet 14 and the other 58 connects the inlet to cavity 3 and issues at a point above openings 12, 14. It can be seen that the lower part of cavity 3 is positioned below openings 12, 14 and, when punch 28 is displaced in order to block these openings, the liquid or gas contained in the lower part of cavity 3 is expelled by pipe 56 into the discharge pipe. The other pipe 58 enables the fluid arriving via the intake pipe to enter cavity 3 during the movement of the plug, and also afterwards. This prevents possible pressure surges in the pipes upstream and a locking of plug 53 is ensured, because the pressure of the fluid entering cavity 3 engages it against the bottom thereof.

Thus, the valve according to the invention offers numerous advantages, the most important of which is to ensure a perfect sealing between the fluid passage zone and the gas arrival zone. This seal is obtained not only by fixing the membrane to the valve body, but also as a result of the fact that the membrane is very deformable, any risk of breaking is obviated. It is possible to use a very deformable material for forming the membrane or to predeform the same, in the manner illustrated in FIG. 3. Moreover, the valve has a simple construction and is consequently relatively inexpensive. It can have reduced dimensions, which reduces its mass and permits its integration into complex systems of the type used in satellite launchers or spacecraft.

What is claimed is:

1. A pyrotechnic valve comprising:
   a valve body having an inner cavity;
   a deformable disk-shaped membrane;
   a rigid weight mounted on said deformable membrane, said rigid weight and said deformable membrane together tightly subdividing said inner cavity into a first part and a second part;
   a fluid inlet and a fluid outlet communicating with said second part of said inner cavity;
   a valve member disposed in said second part of said inner cavity for interrupting passage of fluid therethrough;
   a pyrotechnic device for producing gases in said first part of said inner cavity, said weight being displaceable under the action of the gases produced by said pyrotechnic device so as to move said valve member;
   said membrane being plastically deformable under the action of the gases produced by said pyrotechnic device and said inner cavity being provided with a seat to which the entire membrane is applied once it has been deformed.

2. A pyrotechnic valve according to claim 1, wherein a side of said weight facing said first part of said inner cavity is provided with a recess which absorbs the first thermal shock of the gases produced by said pyrotechnic device.

3. A pyrotechnic valve according to claim 2, further comprising:
   an end fitting disposed within said second part of said inner cavity and which tightly closes said fluid inlet; and
   punch means in contact with said end fitting and movable within said inner cavity to shear said end fitting upon displacement of said punch means by said weight, under the action of the gases produced by said pyrotechnic device.

4. A pyrotechnic valve according to claim 3, wherein said weight and said punch means are separated from one another.

5. A pyrotechnic valve according to claim 3, wherein said weight and said punch means constitute a single member having a passage hole, said passage hole being disposed so as to permit the passage of a fluid from said fluid inlet to said fluid outlet once said single member has been displaced under the action of the gases produced by said pyrotechnic device.

6. A pyrotechnic valve according to claim 3, further comprising locking means for locking said punch means within said inner cavity once it has been displaced under the action of said weight.

7. A pyrotechnic valve according to claim 1, wherein said fluid inlet and said fluid outlet are both open normally and a plug is provided within said second part of said inner cavity, said plug being movable under the action of said weight so as to close at least one of said fluid inlet and said fluid outlet.

* * * * *